United States Patent

Sorenson et al.

Patent Number: 5,285,903
Date of Patent: Feb. 15, 1994

[54] METHOD FOR RECOVERING PARTICULATE AND SCAVENGING FORMALDEHYDE IN A WOOD PANEL FABRICATION PROCESS

[76] Inventors: Blaine F. Sorenson, 18813 SE. Lakehome Rd., Auburn, Wash. 98002; Gary A. Raemhild, 2325 43rd Avenue E., Seattle, Wash. 98112

[21] Appl. No.: 960,109

[22] Filed: Oct. 13, 1992

[51] Int. Cl.$^5$ .......................... B03B 9/00; C02F 1/00
[52] U.S. Cl. .......................................... 209/2; 209/17; 210/195.2; 210/636; 210/650; 210/805
[58] Field of Search ................. 210/195.2, 257.2, 259, 210/388, 636, 196, 650, 651, 805, 806; 162/55, 162, 251; 209/17, 2

[56] References Cited

U.S. PATENT DOCUMENTS

| | | |
|---|---|---|
| 3,220,546 | 11/1965 | Gardner . |
| 3,897,301 | 7/1975 | Bauman et al. . |
| 3,973,987 | 8/1976 | Hewitt et al. ............... 210/257.2 X |
| 4,093,430 | 6/1978 | Schwab et al. . |
| 4,110,086 | 8/1978 | Schwab et al. .................... 55/10 X |
| 4,194,888 | 3/1980 | Schwab et al. . |
| 4,216,000 | 8/1980 | Kofoid . |
| 4,427,551 | 1/1984 | Duveau ............... 210/258 X |
| 4,525,278 | 6/1985 | Frost, III ............... 210/638 |
| 4,587,253 | 3/1986 | Gill et al. ............... 210/257.2 X |
| 4,629,568 | 12/1986 | Ellis, III ............... 210/257.2 X |
| 4,784,771 | 11/1988 | Wathen et al. ............... 210/636 |
| 4,935,149 | 6/1990 | Morse ................ 210/712 |
| 4,943,379 | 7/1990 | Boze et al. ............... 210/778 |
| 4,983,301 | 1/1991 | Szucz et al. ............... 210/636 |
| 5,002,633 | 3/1991 | Maxham . |
| 5,043,071 | 8/1991 | Anselme et al. .................... 210/636 |
| 5,108,626 | 4/1992 | Lees et al. ............... 209/17 X |

OTHER PUBLICATIONS

DESAL Application Bulletins; DESAL-5 Nos. 101-110; Desalination Systems, Inc. Escondido, Calif. 92029.

Primary Examiner—D. Glenn Dayoan
Assistant Examiner—Tuan N. Nguyen
Attorney, Agent, or Firm—Michael J. Folise

[57] ABSTRACT

A thin film membrane filtration system recovers particulate from the waste water stream of a wood panel fabrication process to a desired concentration of approximately 30-50% solid by weight. The high concentration level enables improved transport or disposal. Rather than discard the concentrate, however, the concentrate is added into subsequent wood panel "particle board" batches at a rate of approximately 0.5 to 0.65 gallons per 1000 pounds of wood product. The concentrate reduces press time, serves as a scavenger for tying up formaldehyde and serves as a resin extender for strengthening internal bonds of fabricated panels. The membranes capture the particulate into an accumulated concentrate, while passing permeate output to a recycle water stream.

5 Claims, 2 Drawing Sheets

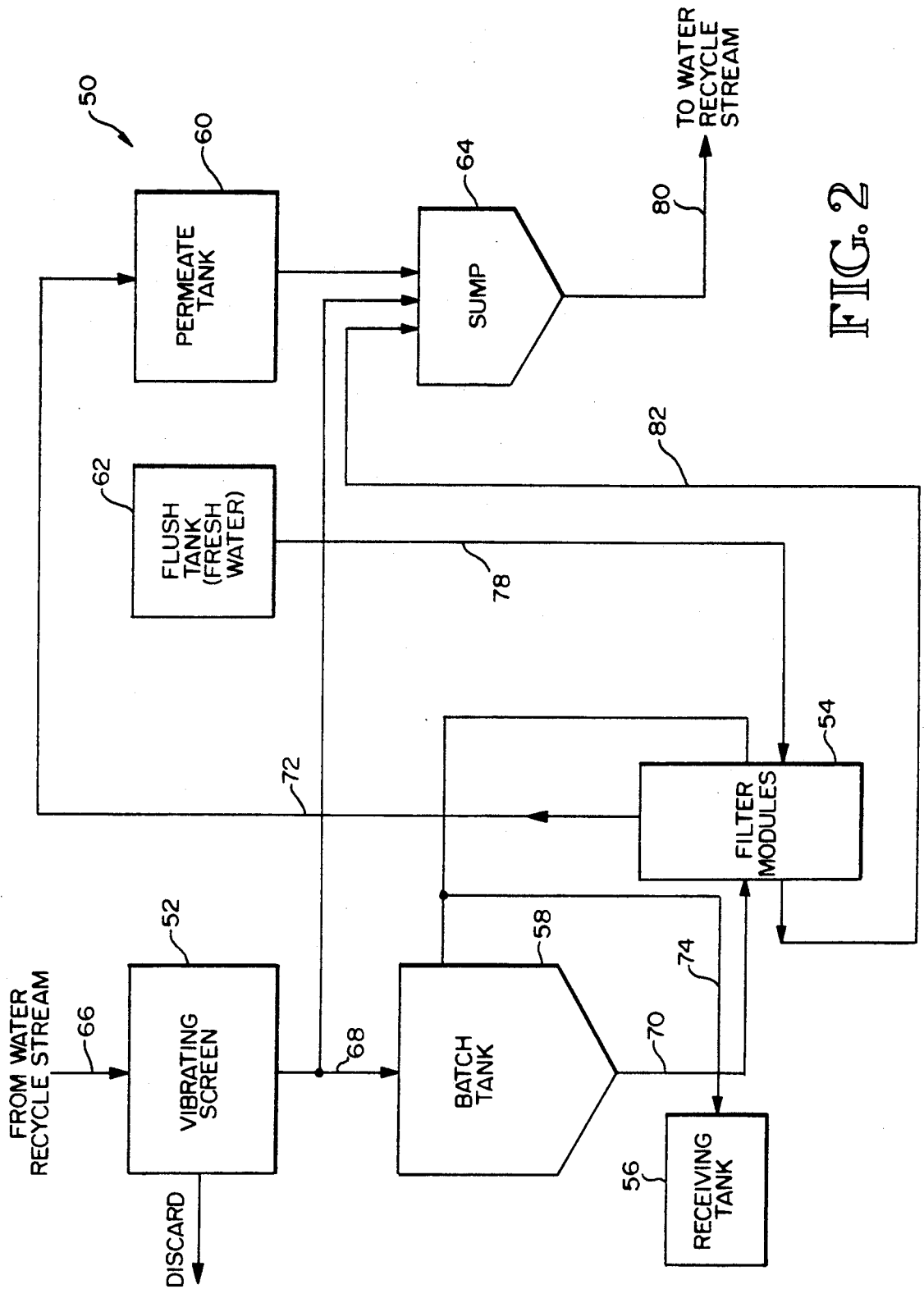

METHOD FOR RECOVERING PARTICULATE AND SCAVENGING FORMALDEHYDE IN A WOOD PANEL FABRICATION PROCESS

BACKGROUND OF THE INVENTION

This invention relates to water treatment methods used during wood panel fabrication processes. More particularly this invention relates to a method and apparatus for filtering and concentrating particulate out of a waste water stream. The resulting concentrate is re-applied to the fabrication process, rather than discarded as waste. The resulting wood panels exhibit less formaldehyde emission during their useful life and stronger internal bonds during testing. The cleaned waste water stream is recycled into the air pollution control system of the fabrication process to collect other particulate. Accordingly, the fabrication process produces improved wood panels with fewer waste by-products.

Wood panel fabrication involves steps of drying the wood product (i.e., furnish, wood flakes, raw material), combining and mixing constituent materials (i.e., wood product, resin, wax and scavenging agents), then pressing the materials into a panel. The output is wood panel (i.e., particle board, plywood, oriented strand board, medium density fiberboard). During the drying operation, by-products including (i) fibers, such as wood ash and wood particles, (ii) semi-solids, including fillers, and (iii) liquids are generated. Such materials are captured by an air pollution control system and collected in a recycling water stream. The liquids and semi-solids include hydrocarbons and other organic molecules. In one known process, by-product gasses are first conditioned with water sprays to achieve adiabatic saturation. As a result, the gas is cooled to the necessary level for hydrocarbon vapors to condense. The fibers, semi-solids and liquids, including hydrocarbon droplets, then are collected by a precipitator and discharged into the recycling water stream.

Removal of the hydrocarbons is especially important when drying resinous species such as Southern Yellow pine or Douglas fir. If not condensed and collected as a droplet, the vapors will condense when discharged to the atmosphere forming a blue haze plume (often characterizing wood drying emissions).

FIG. 1 shows a block diagram of a prior art emission control system 10 used in a wood panel fabrication process. Included is a wet electrostatic precipitator 11, also described in U.S. Pat. No. 4,194,888. The system 10 includes a "first" recycle water quench stage 12 and a "second" clean water flush stage 14. The recycle quench stage 12 includes a preconditioning chamber 24, settling tank 26 and pump 28. The clean water flush stage 14 includes the wet electrostatic precipitator 11, a flush tank 18, and pumps 20, 22.

The precipitator 11 employs a high-intensity ionization electrode configuration which concentrates a charging field in a zone between a disc and a collection tube. The geometry enables formation of a stable, high intensity, electrostatic field. Particle charging of 20 kv per inch is maintained with minimal sparking. An ensuing migration velocity results in a desirably high particulate collection efficiency.

Referring to FIG. 1 and the first stage 12, hot dirty gas, including hydrocarbons, and fibers from the drying wood panel are received into the pre-conditioning chamber 24 at inlet 30. Recycled water from the settling tank 26 is sprayed via pump 28 into the chamber 24 conditioning and cooling the gas stream to achieve adiabatic saturation. Spray nozzles with a large orifice diameter quench the gas stream by producing large diameter droplets. Such large droplets are unlikely to evaporate completely, thereby creating spray-dried particulate. The large nozzles also are less likely to clog. The spent quench water is drained to the settling tank 26 for treatment and recycling. The pre-conditioned gas stream, including hydrocarbon droplets is output at channel 32 into precipitator 11.

The second stage 14 receives the gas stream into a cyclone module 34 of precipitator 11. The cyclone 34 removes any large particles such as wood fibers and large water droplets. Remaining fine mist droplets are transported with the saturated gas as the gas enters precipitator 11. The gas stream passes through distribution devices to insure even flow into collection tubes 36. As the gas enters the tubes 36, the gas passes through a series of high-intensity corona charging fields located at each disk. Within the zone between the disks and the tubes, a high electrostatic charge is imposed on the particles. The droplets and mist together form a water film which flows downward along the length of the tubes 36 aided by gravity and the flow of the gas stream. As the charged particles flow farther down the tubes 36, the electrostatic field forces the charged particles toward the tube walls. Because the fine mist droplets are large relative to the submicron particulate, the droplets are the first particles collected at the tube walls. Clean gas exits the tubes 36 into a clean air plenum, and eventually passes through a fan and up a stack for discharge into the atmosphere.

Periodically clean water from flush tank 18 is sprayed via pump 20 into the precipitator 11 to clean the tubes 36. Because the tubes 36 are continuously wetted during the precipitation and ionization steps, the collection tube surfaces are easily washed by the flush stream. The resulting flush water flows down the tubes 36, is collected in a sump 38 at the bottom of the precipitator 11, then pumped via pump 22 to the settling tank 26.

Typically the solids and particulate accumulate in the settling tank 26, then are removed by surface skimmers, bottom drag chains, aeration/flotation devices, or filters. In practice, the solids removed by these devices can achieve a texture of "pudding". For example, such collected solids typically are 15% to 25% solids by weight. Due to the large percentage of liquid material captured with the solids, waste disposal is difficult. The collected waste typically is disposed of by burning in a wet burner or boiler, or by storage in a landfill. Transporting the waste and storing the waste in a landfill is difficult when the waste includes liquid (i.e., 75% to 85% by weight). Accordingly, there is a need to find clean functional uses for the by-product and to reduce the portions discarded as waste.

Another problem with conventional water treatment systems used for wood panel fabrication processes is that the hydrocarbons tend to stay in solution. Previously, the hydrocarbons have been removed from the water treatment system by disposing of the waste water at rates of several gallons per minute. Simple disposal of such water is undesirable. Further, government regulations for discharging waste water are becoming more restrictive. Accordingly, there is a need to reduce the hydrocarbons in solution within the recycling water stream and a need to achieve higher concentrations of solids, thereby reducing the volume of material and making handling of the material easier.

SUMMARY OF THE INVENTION

According to the invention, a filtration system recovers particulate from the waste water stream of a wood panel fabrication process to a concentration of as high as approximately 45-50% solids by weight. Such a high concentration enables improved transport and handling if disposed of as waste. The concentrated by-product, however, may be substantially reduced and/or eliminated by applying the concentrated by-product into a wood panel mix. In particular, by-product concentrated to 30-50% solids by weight ("concentrate") is added into later wood panel fabrication batches at a conventional mixing apparatus. Adding the concentrate provides a simple, safe efficient way of eliminating the by-products. The concentrate, also, adds beneficial characteristics to resulting wood panels. First, the concentrate serves as a scavenger for tying up formaldehyde component elements thereby reducing formaldehyde emissions over the useful life of the panel. Second, the concentrate serves as a resin extender for strengthening bonds within the wood panels. Third, the concentrate adds moisture to the panel to reduce press time without damaging the pressing process. Thus, what previously was treated as waste material is now given a beneficial use.

According to one aspect of the invention, the filtration system includes thin film membrane filters which achieve surprisingly high solid concentrations of the by-product. Concentration levels of up to approximately 50% solid by weight have been achieved. As a result, the by-product is easier to handle, transport and/or store. Further, permeate output from the membranes is reused in the recycling water stream. Improved filtration enables prolonged use of the recycling water stream, and thus reduces fresh water consumption.

According to another aspect of the invention, the concentrate added to the wood panel mix ties up additional formaldehyde. Typically, formaldehyde scavenging agents are purchased and added into the mixing apparatus during panel fabrication to tie up formaldehyde. The industry is always trying to improve the scavenging results to reduce formaldehyde emissions over the useful life of the panel and comply with increasing tighter emission standards. The concentrate added during fabrication ties up additional formaldehyde beyond what conventional scavenger agents have achieved. In particular, the concentrate is not simply a substitute for adding increased volumes of conventional scavenging agents. The concentrate provides synergistic benefits enabling increased scavenging performance. In the past one could not simply add more scavenger solution to achieve improved scavenging. Beyond a certain amount, the addition of such agents or other liquids, harms the fabrication process.

In particular, when too much scavenger solution is added to the mix, the solution ties up too much formaldehyde from the resin. Thus, the adhesive properties of the resin decrease. The result is an undesirable decrease in panel strength. The added concentrate allows a higher portion of formaldehyde to be tied up without degrading panel strength.

According to another aspect of the invention, the concentrate serves as a resin extender. The concentrate includes lignin, fatty and resinous acids and other compounds from the trees being milled. Adding the by-product to the mixing apparatus in limited amounts strengthens the internal bonds of the panel and increases the adhesive quality of the panel mix. Increased bond strength means stronger panels achieved without increasing volumes of conventional resins. In particular, there is a range of concentrate additive over which the concentrate improves internal bond strength. Beyond a certain point, however, the concentrate may react undesirably with the conventional resin and panel mix offsetting the would-be gains in bond strength.

According to another aspect of the invention, the addition of concentrate enables a faster press time during panel fabrication. In particular, the concentrate enables additional moisture to be added to the panel mix without the formation of undesirable steam pockets during pressing. Because water is a good heat conductor, the added moisture speeds up the curing process for the panel. However, moisture may form steam pockets during pressing. Because of the increased pressure during pressing, some water may remain in liquid state although at a temperature above the typical boiling point. In such case, a decrease in pressure which occurs at the completion of pressing causes the water to convert to steam. The force of expansion occurring during the conversion may blow open the panel when the press is opened. Such an event is referred to as a "blow" and is undesirable. In particular, a blow may cause the production line to shut down. Often a press is used to generate 16,000 square feet of panels per hour. Loss of press time is costly. Accordingly, the addition of moisture is useful for decreasing the cure time, but at some point there is to much moisture resulting in steam pockets that can not be contained by the internal strength of the panel. The concentrate, however, adds adhesive qualities to the panel mix. The added adhesive qualities hold the additional moisture/steam in place when the press is released. Thus, more moisture and a corresponding improvement in cure time is achieved without the occurrence of "blows".

These and other aspects of the invention result in an effective process for capturing wood panel fabrication by-products, for reducing water consumption in the air pollution control system and for discarding by-products collected from the water stream. These and other aspects of the invention also result in an improved wood panel. The invention will be better understood by reference to the following detailed description taken in conjunction with the accompanying drawings.

BRIEF DESCRIPTION OF THE DRAWINGS

FIG. 2 is a block diagram of a membrane filtration subsystem for recapturing particulate in a water recycle stream of a wood panel fabrication process according to an embodiment of this invention.

DESCRIPTION OF SPECIFIC EMBODIMENTS

Overview

Figure 1:
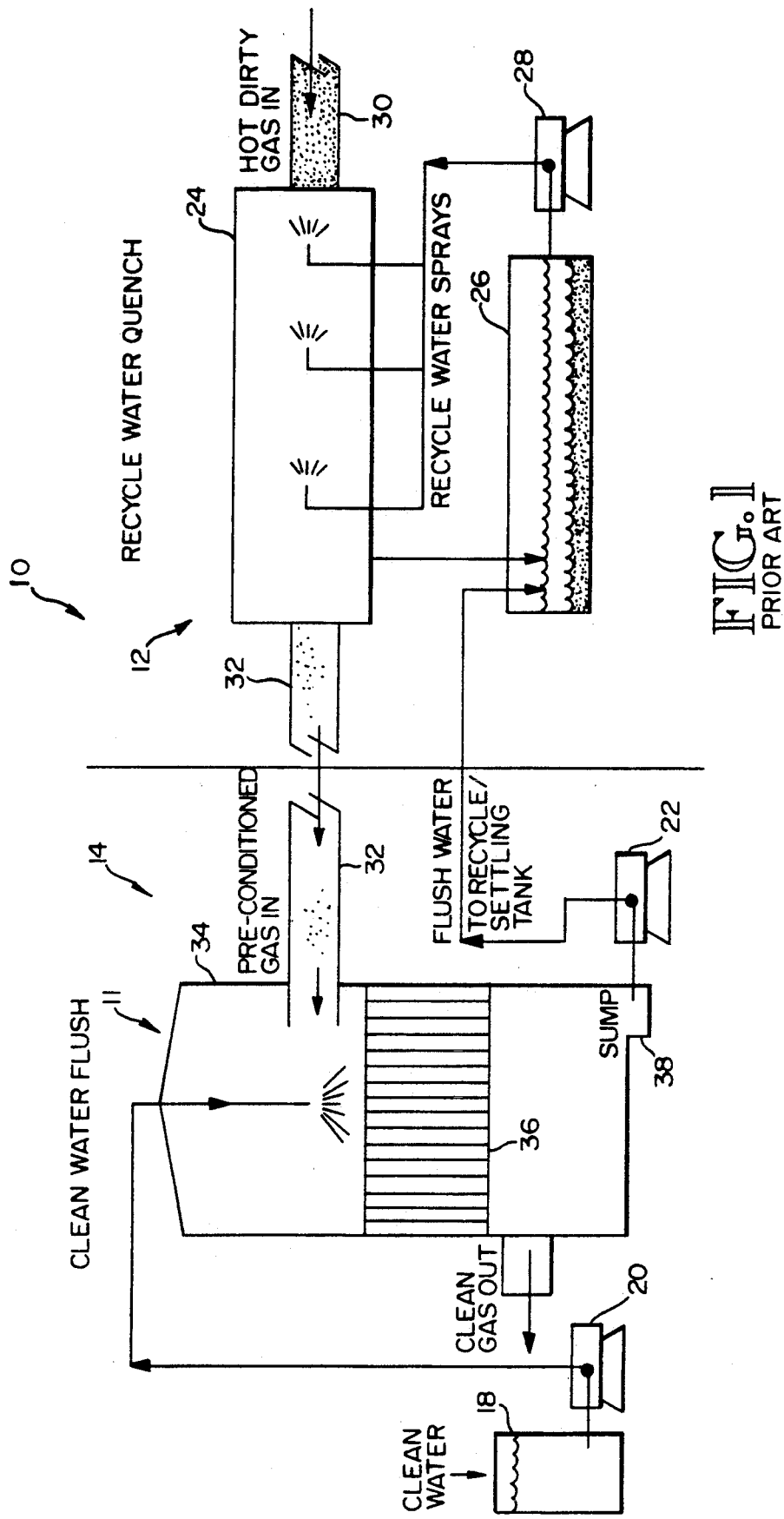
FIG. 1 is a block diagram of a prior art water treatment system used in wood panel fabrication processes.

FIG. 2 shows a block diagram of a membrane filtration system 50 according to an embodiment of this invention. The system 50 collects particulate gathered by air emission control equipment during wood panel fabrication. In one application, the filtration system 50 is used with the recycle/settling tank 26 of water treatment system 10 (See FIG. 1). During wood panel fabrication, by-products (i.e., fiber, semi-solid and liquid materials, including hydrocarbons and other organic compounds) occur which are gathered using emission control equipment. The by-products are collected in a recycle water stream. Dirty recycle water, including the fabrication by-products enter the recycle/settling tank 26, then pass into the filtration system 50 at vibrating screens 52. The vibrating screens 52 extract large particles which are discarded. The remainder passes back into the recycle/settling tank for reuse. Periodically, a batch of the screened water is processed by the filtration system 50 to capture smaller particles. The membrane filters accumulate a concentrate of solids held in liquid, along with permeate (i.e., cleaned water). The concentrate is collected for adding into a wood panel mix. The permeate is passed back to the recycle/settling tank 26 for reuse. The permeate combines with the other recycle water and re-enters the conditioning chamber 24 to collect additional by-product.

The extracted concentrate is up to approximately 50%, typically 40–45%, solid by weight. In one embodiment, the concentrate is re-used by adding it to a mixing apparatus with the conventional wood product, resin, wax and scavenger solution to produce improved wood panels. In particular, the concentrate serves as a formaldehyde scavenger and a resin extender. The concentrate ties up additional formaldehyde and strengthens internal bonds. In addition, the concentrate reduces the time for pressing the panel.

Filtration System 50

Filtration system 50 is described as used with emission control system 10 during wood panel fabrication. Referring to FIG. 2, the filtration system 50 includes vibrating screens 52, receiving tank 56, batch tank 58, filter module 54, permeate tank 60, flush tank 62, and sump 64. Also included, but not shown, are several valves and pumps for directing and aiding water flow through filtration system 50. The filtration system continuously screens an incoming water stream and periodically performs a membrane filtration on a batch collected from the water stream. Screening separates out large particulate by-product which is discarded. Membrane filtration accumulates a concentrate of finer by-product which is re-used in panel fabrication. As previously described, the by-product includes fibers, semi-solids and liquids (hydrocarbons and other organic compounds) driven off during the drying step of the fabrication process.

As shown in FIG. 1, dirty water from the conditioning tank 24 and/or precipitator sump 38 are pumped into the recycle/settling tank 26. The "liquor" 66 (See FIG. 2) at the bottom of the tank 26 is pumped at approximately 30 gallons per minute to the filtration system 50. The liquor 66 includes by-products in solution at a concentration between 5% and 25% solids by weight. Although the liquor 66 is pumped at approximately 30 gallons per minute in one embodiment, the rate may vary. Typical rates are between 5 and 35 gallons per minute.

The liquor 66 is received at vibrating screens 52. In one embodiment, the screens 52 are 100 mesh. Particles larger than 150 microns are separated from the liquor and discarded. The screened portion passes back into the recycle/settling tank via sump 64. Periodically, however, a batch of screened liquor instead flows into the batch tank 58 for membrane filtration. A valve is used to direct the screened liquor to the batch tank 58 or sump 64. When the batch tank 58 is full, an infeed valve is turned off and a pump started. The pump circulates the batch tank liquid 70 through membranes of the filter module 54 and back into the batch tank 58 at approximately 100 gallons per minute. As the liquid 70 re-circulates, permeate (cleaned water) 72 is output to permeate tank 60 at a rate of approximately 1.5 to 6 gallons per minute. The liquid 70 thus increases in concentration. The line leading to the filter module 54 from batch tank 58 includes pressure cut-off valves to avoid damaging the membranes. In one embodiment, flow is cut off when pressure exceeds 125 PSI or is less than 10–50 PSI.

When the liquid 70 reaches a desired concentration (i.e., 30–50%, preferably 35–45% solid by weight), the circulation is discontinued. Batch concentrations of up to 47% have been observed using the membrane filter modules 54.

In one embodiment, the membranes are thin film ultrafiltration membranes having an approximate molecular weight cut-off of 15,000 to 20,000. In one specific embodiment, the membrane is the Desal-5 thin film ultrafiltration membrane, model no. GN40040CJN, produced by Desalination Systems, Inc. of Escondido, Calif. Previously, such membranes have been used for various applications, such as metal reclamation from rinse water, oil separation, decontamination of nuclear plant cooling water, removal of color or hardness from natural waters, and more. The concentration of by-product beyond 40% solid by weight, however, was a surprising result to the membrane manufacturer and the filtration system 5 inventors.

When the liquid 70 in the batch tank 58 reaches the desired concentration (i.e., 35–45% solid by weight), the concentrated liquid 74 ("concentrate") is discharged through the filter modules 54 into the receiving tank 56. To accomplish the discharge step a valve in the batch tank recycle path is closed, while a valve in the receiving tank path is opened. Concentrate 74 is directed to the receiving tank 56. The concentrate 74, is often 3 to 5 times more concentrated than the input liquor 68 when discharged. In practice concentrate is generated at a rate of approximately 15-25 gallons per hour. From the receiving tank, the concentrate 74 is metered into a mixing apparatus of a wood panel fabrication facility.

To prevent fouling of the membrane surface over continued use, the filter modules 54 are backflushed periodically. Backflushing may be performed every batch or every 1 to 2 hours. Fresh water 78 from a flush tank 62 is pumped through the membranes while the batch tank 58 contents are held within the batch tank 58. Membrane residue is driven off the membranes and flows with the flush water along path 82 into the sump 64.

In one embodiment, the permeate tank 60 and batch tank 58 include float valves for detecting whether the respective tanks are filled to a prescribed maximum level or emptied to a prescribed minimum level.

When the permeate tank 60 fills with permeate, the contents are released into sump 64. As needed, water 80 from sump 64 is pumped into the recycle stream of water treatment system 10 (i.e., into a waiting tank, then conditioning chamber 24).

Re-Using the Concentrate in Panel Fabrication

Previously by-products gathered by emission control systems have been discarded as waste material. According to this invention, the by-product (i.e., concentrate), instead is added to subsequent wood panel mixes. In one embodiment, the concentrate is metered into the panel fabrication mixer at a rate of between approximately 0.25 and 1.0 gallons per 1000 pounds of wood product, material), preferably approximately 0.5 to 0.65 gallons per 1000 pounds. As used herein, wood product is the raw wood added to the wood panel mix. For varying wood panels, the wood product varies among furnish, flakes or other form of raw wood.

Adding the concentrate to the fabrication process provides many benefits. First, the press time for wood panels is reduced by approximately 5%. For example, the press time for wood panels formed from Douglas fir and Redwood trees showed an approximately 5% decrease. As a result, mill capacity can be increased by 5%. Second, the concentrate serves as a formaldehyde scavenger. Third, the concentrate serves as a resin extender.

One concern when adding materials to the mixer is avoiding increases in the moisture content of the panel under fabrication. When too much moisture is entered into the wood panel, steam from the moisture rapidly expands, or blows, during the pressing step. Specifically, the board blows when the press opens and may leave panel fragments stuck to the press. If so, then the press and the fabrication line are shut down, while the press is cleaned. As a typical mill line may produce 50 semi-truck loads per day, the loss of press time for one hour or more may significantly decrease the mill output. As the mills frequently operate at slim profit margins, the decrease in productivity causes significant economic damage. By using the filtration system 50 of this invention, the concentrate adds sufficient adhesive qualities to offset any increased moisture content for a given operating flow rate of concentrate. Flow rates of 0.5 to 0.65 gallons per 1000 pounds of wood product are preferred for concentrate at 35-45% solids by weight.

Adding the concentrate to the wood panel mix provides a simple, inexpensive, safe way of reducing waste by-product. The scavenging and resin extending attributes of the concentrate are discussed below.

Concentrate Serves as a Formaldehyde Scavenger

Formaldehyde is found in wood products and typically emitted in small amounts over the useful life of commercial wood products. Typically, government regulates the amount of emissions permissible. To comply with such government regulations, wood panel fabricators include scavenging solution into the panel mix. The scavenging solution ties up the formaldehyde in compounds so as to reduce emissions over the life of the wood product. Without scavenger agents, formaldehyde emissions typically are approximately 0.40 parts per million (ppm) in processed wood (based on the industry standard large chamber formaldehyde test index). As of 1992, the U.S. Government's Agency for Housing and Urban Development (HUD) requires that formaldehyde emissions be less than 0.30 parts per million. The industry, however, desires to get the emissions below 0.20 ppm (as indexed to the industry-standard large chamber formaldehyde test) to meet toughening standards. Based upon empirical data, mills in the U.S. and abroad are able to get emissions down to approximately 0.20 ppm, although with difficulty, by adding conventional scavenging solutions. However, the expense in meeting such level is high. Accordingly, a reliable, consistent solution for reducing formaldehyde emissions in wood panels is needed.

It has been discovered that formaldehyde emissions reduction in wood panels can be improved by approximately 0.01 ppm when 35-45% concentrate is added to the wood panel mix fabrication at a rate of 0.5 to 0.65 gallons per 1000 pounds of wood product (i.e., furnish, flakes, raw materials). During empirical testing of batches of Douglas fir and Redwood wood product, emissions went from 0.18 and 0.19 to 0.17 when 35-45% concentrate is added at 0.5 to 0.75 gallons per 1000 pounds of wood product. When added at 1 gallon per 1000 pounds of wood product, the emissions went down to 0.16 ppm.

Thus, by adding 0.5 to 0.75 gallons per 1000 pounds of wood product, preferably 0.5 to 0.65 gallons, formaldehyde emissions are decreased by 0.01 ppm or more. As the industry is able to achieve near 0.20 ppm using conventional scavenging agents, the added concentration provides increased performance to *consistently achieve* less than 0.20 ppm without significant cost increases.

Concentrate Serves as a Resin Extender

One characteristic of wood panels is the strength of internal bonds. With weak bonds the boards particle composition separates under forces that are undesirably low. Improvements in bond strength mean stronger wood panels. Empirical testing has revealed that their is an optimal amount of concentrate to add the wood panel during fabrication to achieve increased bond strength. Beyond such amount, the internal bond strength decreases.

Using an industry standard test for measuring internal bond strength of particle board, strengths of 88 to 95 PSI were obtained without adding concentrate for particle board panels formed from Douglas fir and Redwood wood product. When concentrate of 35-45% solid by weight is added at a rate of 0.5 to 0.65 gallons per 1000 pounds of wood product, internal bond strength improves to 100 to 105 PSI. When concentrate is added at a rate of 0.75 to 1.0 gallons per 1000 pounds of wood product, hour internal bond strength is 83 to 93.

Conventionally, resin is added to the mix during fabrication to provide the "glue" that establishes strong internal bonds. When 35-45% concentrate also is added at a rate of 0.5 to 0.65 gallons per 1000 pounds of wood product, internal bond strength improves. As a result stronger wood panels are achieved. Alternatively, wood panels of similar strength can be produced using less off-the-shelf resin.

Concluding Remarks

Although a preferred embodiment of the invention has been illustrated and described, various alternatives, modifications and equivalents may be used. For example, although the filtration system is described as used with a wet electrostatic precipitator, the filtration system may be used with other water treatment systems during wood panel fabrication processes. Therefore, the foregoing description should not be taken as limiting the scope of the inventions which are defined by the appended claims.

What is claimed is:

1. A method for recycling by-product of a wood panel fabrication process, the by-product comprising wood fiber, semi-solids and liquids, including hydrocarbon molecules, the fabrication process employing an emission control system in which a water stream collects the by-product, the recycling method comprising the steps of:

screening a liquor of by-product to separate large particulate and pass screened by-product to a batch tank;

circulating the screened by-product between the batch tank and a thin film membrane to concentrate the by-product;

discharging concentrated by-product to a receiving tank when the circulating by-product concentration reaches approximately 35–45% solid by weight;

recycling permeate output from the membrane during circulation into the water treatment system for re-use in collecting wood panel fabrication by-product; and adding the concentrated discharged by-product to a wood panel mixing apparatus at a rate of approximately 0.5 to 0.65 gallons per 1000 pounds wood product.

2. The concentrated by-product accumulated by the method of claim 1 which reduces formaldehyde emissions when added to a wood panel mix during fabrication.

3. The concentrated by-product accumulated by the method of claim 1 which strengthens internal bonds of a wood panel when added to a wood panel mix during fabrication.

4. A method for recycling by-product of a wood panel fabrication process, the by-product comprising wood fiber, semi-solids and liquid, including hydro-carbon molecules, the fabrication process employing an air emission control system in which a water stream collects the by-product into a liquor, the recycling method comprising the steps of:

screening a batch of liquor by-product to separate large particulate and periodically passing screened by-product to a batch tank;

circulating the screened by-product between the batch tank and a thin film membrane to concentrate the by-product;

discharging concentrated by-product to a receiving tank when the circulating by-product concentration reaches approximately 30–45% solid by weight;

recycling permeate output from the membrane during circulation into the water treatment system for re-use in collecting wood panel fabrication by-product; and adding the concentrated discharged by-product to a wood panel mixing apparatus at a rate of 0.5 to 0.65 gallons per 1000 pounds of wood product.

5. A method for capturing by-product of a wood panel fabrication process, the by-product comprising wood fiber, semi-solids and liquid, including hydro-carbon molecules, the fabrication process employing an emission control system in which a water stream collects the by-product, the recycling method comprising the steps of:

screening a liquor of by-product to separate large particulate and pass screened by-product to a batch tank;

circulating the screened by-product between the batch tank and a thin film membrane to concentrate the by-product;

discharging concentrated by-product to a receiving tank when the circulating by-product concentration reaches approximately 40–45% solid by weight; and recycling permeate output from the membrane during circulation into the water treatment system for re-use in collecting wood panel fabrication by-product.

* * * * *